Sept. 6, 1932.　　　C. M. ADAMS　　　1,876,483
ELECTRIC GAUGE
Filed Dec. 16, 1929　　2 Sheets-Sheet 1

INVENTOR
Clark M. Adams.
BY
ATTORNEYS

Sept. 6, 1932.   C. M. ADAMS   1,876,483
ELECTRIC GAUGE
Filed Dec. 16, 1929   2 Sheets-Sheet 2

INVENTOR.
Clark M. Adams.
BY
ATTORNEYS.

Patented Sept. 6, 1932

1,876,483

UNITED STATES PATENT OFFICE

CLARK M. ADAMS, OF TOLEDO, OHIO, ASSIGNOR TO NAGEL ELECTRIC COMPANY, OF TOLEDO, OHIO, A CORPORATION OF OHIO

ELECTRIC GAUGE

Application filed December 16, 1929. Serial No. 414,391.

This invention relates to electrical indicating instruments of the type in which an angularly movable pointer is controlled by electromagnets subjected to varying currents, and more particularly to an improved circuit arrangement and an indicating instrument suitable for use with a float controlled rheostat to indicate the quantity of liquid in a tank.

The present invention has among its most important objects to provide an indicating instrument of a simple and compact construction which is positive and reliable in operation and which is inexpensive to manufacture.

A further object is to provide an indicating instrument having a pointer movable with a pivoted armature, which is controlled by two magnets in a single operating circuit which are arranged with their magnetic fields in quadrature, the circuit being provided with a variable resistance so connected to the electromagnets as to simultaneously and oppositely vary the current through the two magnets.

A further object is to provide an indicating instrument of the character above described in which the armature and pointer have a range of movement of substantially 90°.

A further object is to so dispose the electromagnets with respect to an armature pivoted midway between its ends that both ends of the armature are simultaneously acted upon by the magnetic fields of each of the magnets.

A further object is to so energize and dispose the magnets with respect to the armature as to provide a fairly uniform angular movement of the pointer that is approximately proportional to movements of the level of liquid that operates the contact arm of the variable resistance.

A further object is to provide an instrument having two electromagnets through which the electric current is inversely varied and in which a single wire is required between the instrument and the controlling rheostat and in which the movable contact member of the rheostat and a terminal of one of the magnets are grounded.

A further object of the present invention is to provide an indicating instrument which is adapted to be operated by a rheostat which is grounded through its movable contact member, thereby greatly simplifying the construction of the rheostat, making it necessary to insulate only the resistance coil.

With the above and other objects in view, the invention may be said to comprise the instrument as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which.

Figure 1:
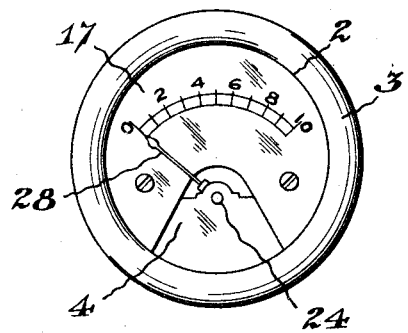
Figure 1 is a plan view of the indicating instrument.
Figure 2:
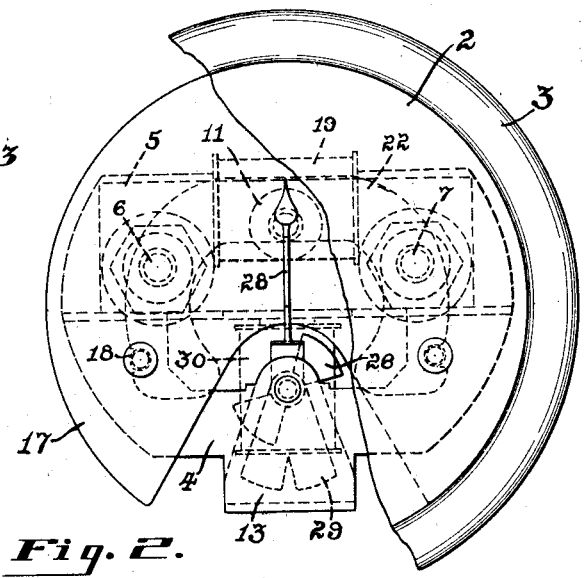
Fig. 2 is an enlarged plan view of the instrument with a portion of the dial plate and casing broken away to show the interior mechanism.
Figures 3, 4:
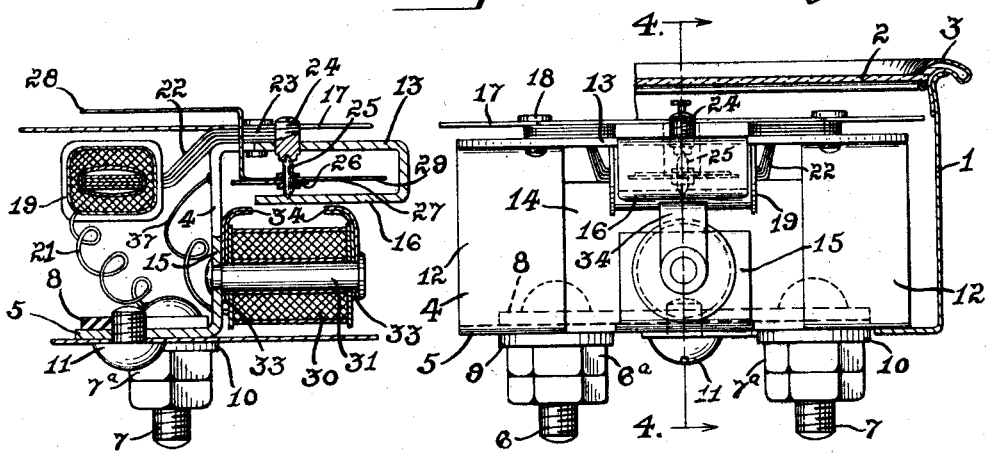
Fig. 3 is an elevation of the indicating mechanism removed from the casing.
Fig. 4 is a section taken on the line indicated at 4—4 in Fig. 3.

The instrument illustrated in the accompanying drawings is designed for attachment to the dash of an automobile and to be controlled by a float operated rheostat that is carried by the fuel tank.

The indicating instrument is housed within a cup-shaped sheet metal casing 1 formed of a non-magnetic metal, the open end of the casing being closed by a crystal 2 held in place by a bezel 3. The instrument proper is removable as a unit from the casing 1, all parts being supported upon a one-piece metal frame 4 formed from non-magnetic sheet metal. The supporting frame 4 has a bottom flange 5 which rests upon the bottom of the casing 1 and this bottom flange carries terminal posts 6 and 7 which project through openings in the bottom of the casing 1. The terminal posts are insulated from the frame 4 by an insulating plate 8 that rests upon the top of the flange 5 and by insulating washers 9 and 10 interposed between the bottom of the casing 1 and the clamping nuts 6a and 7a of the posts. Terminal posts have heads that engage the insulating plate 8 and nuts 6a and 7a at their outer ends which clamp the washers 9 and 10 in place.

The supporting frame 4 is secured to the bottom of the casing 1 by means of a screw 11 substantially at the center of the flange and the frame 4 is provided with spaced supporting posts 12 extending upwardly from the flange 5 at right angles thereto and connecting the flange 5 with an oppositely extending top flange 13 at right angles to the posts 12, the posts 12 being separated by a central aperture 14 formed in the plate from which the frame 4 is made. A portion of the plate between the posts 12 is bent upwardly at right angles to the bottom flange 5 to provide a central vertical post or flange 15. The top flange 13 is bent downwardly at its outer end and inwardly to provide a flange 16 that is spaced below the top flange 13. A dial plate 17 is rigidly secured to the top flange 13 of the frame by means of screws 18. Immediately beneath the dial plate and over the flange 5, there is mounted an electromagnet 19 which has wires 20 and 21 leading from its terminals to the terminal posts 6 and 7.

The electromagnet 19 has a laminated U-shaped core 22 formed of soft iron plates, the arms of which project laterally from the opposite ends of the magnet winding and have upwardly offset ends 23 which are clamped between the dial plate 17 and the top flange 13 of the frame 4, the U-shaped core serving to support the magnet 19 forwardly of the posts 12 of the supporting frame.

Midway between the arms or pole pieces 23, the top flange 13 has mounted therein a removable and adjustable bearing member 24 which has a conical recess at its lower end to receive the upper end of a pointer arbor 25, the lower end of which is received in a conical recess formed in the flange 16.

Rigidly attached to the arbor 25, there is an armature 26 in the form of a soft iron plate having end portions of segmental shape, the armature being attached midway between its ends to the arbor. The arbor 25 also has attached thereto, an arm of non-magnetic metal which has a pointer 28 at one end which is upwardly offset and positioned to move over the top surface of the dial plate. The arm 27 also has a counter balancing portion 29 projecting to the side of the arbor opposite the pointer 28.

A second electromagnet 30 is mounted immediately beneath the flange 16 with the axis of its core disposed at right angles to the axis of the core of the electro-magnet 19. The electromagnet 30 is supported from the intermediate post or flange 15 by means of a soft iron core 31 in the form of a rivet which serves to secure the magnet to the supporting post 15. At the opposite ends of the magnet 30, laterally projecting laminated pole pieces 33 are attached to the core member 31 and these pole pieces have inwardly bent end portions 34 which are disposed at equal distances on opposite sides of the arbor 25. One terminal of the magnet 30 is connected by a wire 36 to the wire 21 leading from the magnet 19 to the terminal post 7 and the opposite end of the magnet winding is grounded to the supporting frame 4 by a wire 37.

Figure 5:
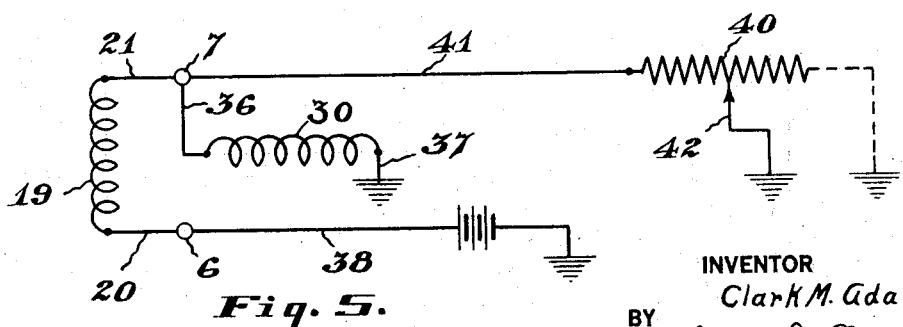
Fig. 5 is a wiring diagram illustrating the instrument controlling circuit.

The terminal post 6 is adapted to be connected to a suitable source of current, such as a battery, by a wire 38 as shown in Fig. 5 and the terminal 7 is adapted to be connected to a suitable rheostat having a resistance coil 40 by a wire 41, the rheostat being provided with a grounded movable contact member 42.

It will be apparent by reference to Fig. 5 that when the movable contact member 42 is in a position to cut the resistance 40 out of the circuit, the winding of the magnet 30 will be short circuited and practically no current will flow through this magnet. In this position of the movable contact member, a certain current will flow through the winding of the magnet 19 while the current through the magnet 30 is practically zero. As the movable contact member 42 moves toward the right, as shown in Fig. 5, the resistance 40 will be gradually cut into the circuit and a gradually increasing amount of current will be forced through the winding of the magnet 30, the current passing through the resistance 40 and the winding of magnet 30 being inversely proportional to the resistance of the portion of the resistance coil 40 in the circuit and the resistance of the winding of the magnet 30. At the same time, the total resistance of the circuit will be gradually increased and the current through the winding of the magnet 19 will decrease in inverse proportion to the said total resistance.

The effect of the variation of the rheostat resistance in the circuit is to inversely vary the current through the two electromagnets and thereby inversely vary the strength of the magnetic fields. The current through the magnet 19 will vary downwardly from a maximum which is the current flowing through the winding of the magnet when the resistance of the rheostat is short-circuited to a minimum which is the current through the magnet winding when the resistance 40 is entirely introduced into the circuit. The current through the winding of the magnet 30 will be at its maximum when the current through the winding of the magnet 19 is at its minimum, i. e., when the maximum amount of the resistance of the rheostat has been cut into the circuit. Since the resistance 40 of the rheostat is in series with the winding of the magnet 19 and in parallel with the winding of the magnet 30, the maximum current through the winding of the magnet 30 is somewhat less than the maximum current passing through the magnet 19.

The ratio of the current through the windings of the magnets 19 and 30 decreases quite rapidly during the initial movement of the contact member 42 in a direction to introduce resistance into the circuit, but this rate of decrease in the ratio becomes less and less as the rheostat resistance is increased.

It is therefore important that the resistances of the windings of the two magnets and the total resistance of the rheostat be so proportioned as to obtain a suitable range of current through both magnets to obtain the relative variations in the strength of the magnetic fields necessary to impart the desired angular movement to the pointer 28.

It is also necessary to so proportion the strength of the magnets and to so dispose the magnetic fields of the two magnets with respect to the armature 26 as to obtain a relatively wide range of movement of the armature and pointer with a reasonable uniformity of angular movement throughout the range of current values in the two windings.

It will be observed that, in the instrument of the present invention, the armature 26 may move from a position wholly within the field of the magnet 19 to a position in which it is substantially within the magnetic field of the magnet 30 and that, since the poles of both magnets are diametrically disposed with respect to the arbor 25, both ends of the armature are simultaneously subjected to magnetic pull of the two magnetic fields. The resistance ratios of the two windings and rheostat must not only be proportioned with reference to the strength of the current supplied to the circuit but also with reference to the variations in the torque components of the pull of the two magnetic fields on the armature. Since the magnet 19 receives at all times a greater current than the magnet 30, the poles of the magnet 19 are disposed at a greater distance from the axis of the armature 26 than the poles of the magnet 30, so that as the armature swings toward the magnetic field of the magnet 30, the magnetic pull on the armature exerted by the magnet 30 will rapidly increase. By placing two magnetic fields on opposite sides of the plane of movement of the armature with the poles of the magnet 30 at a distance from the axis of the armature and less than the length of the armature arms, a range of movement of the armature of nearly 90° may be obtained, the magnetic pull of the magnet 30 being greatly increased by this arrangement, as the armature approaches a position in alinement with the poles of the magnet 30. The lateral spacing of the poles of the two magnets with respect to the plane of movement of the armature also serves to provide a more advantageous variation of the torque component of the magnetic pull on the armature with the torque component decreasing very rapidly as the armature approaches the pole alining position to offset the rapid increase in the magnetic force exerted on the armature, so that small variations in the ratio of the current passing through the magnets will produce definite angular movements of the pointer throughout its entire range of movement. By selecting proper resistance values for the magnet windings and rheostat and by properly adjusting the poles of the two magnets with respect to the axis and the plane of movement of the armature, the movement of the pointer over the dial may be made sufficiently uniform with respect to the movement of the movable contact member of the rheostat that the dial may be calibrated to accurately indicate the extent of movement of a float actuating the contact member.

It is, of course, apparent that the resistance and number of turns of the magnet windings and rheostat may be varied considerably and that the relative positions of the magnet poles with respect to the axis and plane of movement of the armature may be so determined as to obtain the required uniformity of angular movement of the pointer. It has been found, however, that for an instrument designed for use with a float controlled rheostat, the best results are obtained when the total resistance of the rheostat is somewhere near twice that of the winding of the magnet 19 and when the resistance of the winding of the magnet 30 is substantially the same or slightly in excess of the resistance of the winding of the magnet 19.

It has been found that in an instrument designed for connection to the six volt battery of an automobile, excellent results may be obtained by employing for the magnet 19, a winding of 900 turns of No. 37 enameled copper wire having approximately 30 ohms resistance and for the winding of the magnet 30, 1600 turns of No. 36 enameled copper wire having approximately 39 ohms resistance, the resistance coil of the tank rheostat having approximately 120 turns of enameled nichrome wire of approximately 60 ohms resistance.

Another instrument of excellent operating characteristics employed a winding for the magnet 19 of 1200 turns of No. 37 enameled copper wire having approximately 40 ohms resistance, a winding for the magnet 30 having 2000 turns of No. 36 enameled copper wire of approximately 52 ohms resistance and a tank rheostat winding of approximately 120 turns of No. 34 nichrome wire and 120 ohms resistance.

The relative resistances of the magnet windings and rheostat windings are chosen to obtain a suitable range of currents in the two magnets and the poles of the magnets are so disposed with respect to the armature as to obtain the necessary uniformity of the movement of the armature throughout substantially 90° of movement.

Figures 6, 7:
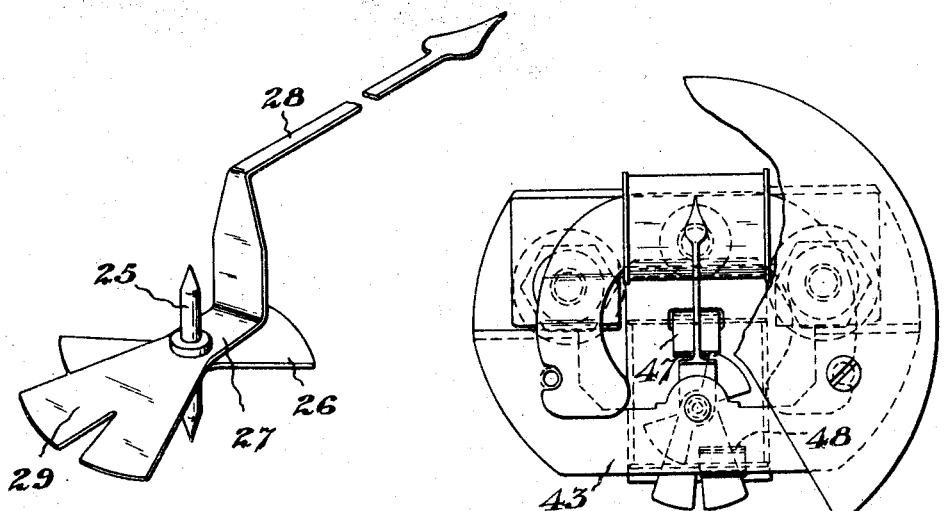
Fig. 6 is a perspective view showing the armature pointer and the arbor to which the armature and pointer are attached.
Fig. 7 is a plan view showing a slightly modified construction.
Figures 8, 9:
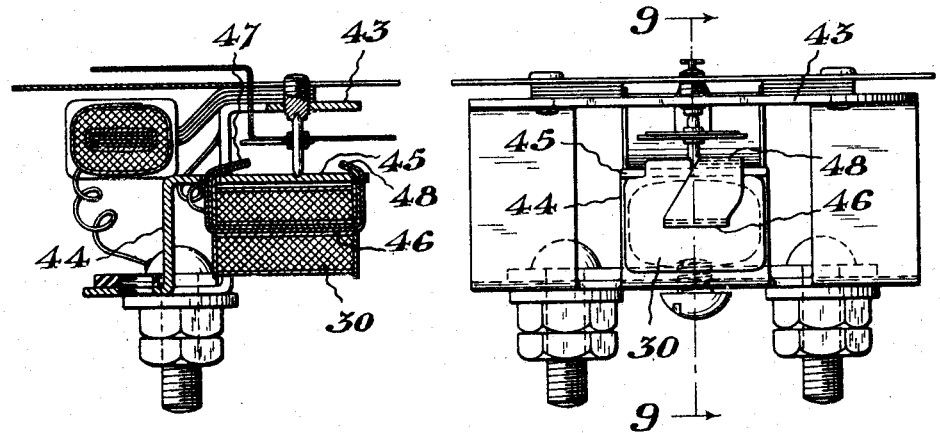
Fig. 8 is an elevation of the indicating mechanism shown in Fig. 7.
Fig. 9 is a section taken on the line indicated at 9—9 in Fig. 8.

In Figs. 7, 8 and 9 of the drawings, there is illustrated a slightly modified construction in which the magnet 30 is supported in a different manner upon the supporting frame. In this modification, the supporting frame is provided with a straight top flange 43 and the intermediate post 44 of the frame is offset forwardly with respect to the vertical portion and is provided with a straight horizontal flange 45 parallel with the top flange 43. The magnet 30 in this case is provided with a U-shaped laminated soft iron core 46, the arms of which have inwardly bent ends 47 and 48, one of which is bent over the outer edge of the flange 45 and the other of which extends through an aperture in the flange 45 and is bent inwardly over the flange, the core 46 in this case serving to support the magnet 30 on the flange 45. The modification shown in Figs. 6, 7, 8 and 9 is purely structural, the operation being identical with that of the instrument illustrated in Figs. 1 to 6.

It will be apparent that the instrument of the present invention is of very simple and compact construction and composed of a minimum number of parts, all of which can be manufactured cheaply and quickly and easily assembled.

Furthermore, it will be apparent that the instrument of the present invention, by providing an armature with oppositely extending arms simultaneously acted upon by the two magnetic fields, is very sensitive to variation in the strength of the two fields and capable of accurately registering such variations.

In addition, it will be noted that the arrangement of the poles of the magnets with respect to the axis and the plane of movement of the armature provides a wide range of angular movement of the armature and pointer with one of the magnetic field currents varying from zero to a maximum and the other varying from a minimum that is somewhat less than the minimum of the first magnet to a maximum. The greater number of turns of the first magnet produces a magnetic field of greater strength per unit of current.

It will further be apparent that the instrument herein disclosed is capable of being actuated by means of a rheostat which has its movable contact arm grounded, thereby permitting the use of a rheostat of very simple and inexpensive construction requiring insulation only for the resistance winding.

Furthermore, it is to be understood that the particular form of apparatus shown and described, and the particular procedure set forth, are presented for the purposes of explanation and illustration and that various modifications of said apparatus and procedure can be made without departing from my invention as defined in the appended claims.

What I claim is:

1. In an electrical indicating instrument, an armature mounted to swing about a fixed axis, and a pair of electromagnets having poles positioned laterally of said axis and angularly spaced with respect to the axis, the poles of said magnets being on opposite sides of the plane of the armature.

2. In an electrical indicating instrument, an armature mounted to swing about a fixed axis, and a pair of electromagnets having poles positioned laterally of said axis and angularly spaced with respect to the axis, the poles of said magnets being at different distances from the axis of the armature.

3. In an electrical indicating instrument, an armature mounted to swing about a fixed axis, and a pair of electromagnets having poles positioned laterally of said axis, and angularly spaced with respect to the axis, the poles of said magnets being at different distances from said axis and on opposite sides of the plane of the armature.

4. In an electrical indicating instrument, an armature mounted to swing about a fixed axis, and a pair of electromagnets having poles positioned laterally of said axis and angularly spaced with respect to the axis, the poles of said magnets being on opposite sides of the plane of the armature with a pole of one magnet spaced a greater distance from said axis and from the plane of the armature than a pole of the other magnet.

5. In an indicating instrument, an electromagnet having spaced laterally extending pole pieces, an armature pivoted to swing about an axis midway between said pole pieces and at right angles to the plane thereof, said armature extending on opposite sides of said axis, and a second electromagnet having its poles diametrically disposed with respect to said axis and in quadrature with the poles of the first magnet.

6. In an indicating instrument, an electromagnet having spaced laterally extending pole pieces, an armature pivoted to swing about an axis midway between said pole pieces and at right angles to the plane thereof, said armature extending on opposite sides of said axis, said armature having diametrically opposite arms of equal length, said armature being spaced from the plane of said pole pieces and being of a length less than the distance between said pole pieces, and a second electromagnet having poles disposed in quadrature with the poles of the first magnet and on the opposite sides of the plane of the armature, the poles of the second electromagnet being closer to the plane of the armature.

7. In an indicating instrument, an electromagnet having spaced laterally extending pole pieces, an armature pivoted to swing about an axis midway between said pole pieces and at right angles to the plane thereof, said armature extending on opposite sides of said axis, said armature having diametrically opposite arms of equal length, said armature being spaced from the plane of said pole pieces and being of a length less than the distance between said pole pieces, and a second electromagnet having poles disposed in quadrature with the poles of the first magnet and on the opposite side of the plane of the armature, the poles of the second electromagnet being closer to the plane of the armature.

8. In an indicating instrument, an electromagnet having spaced laterally extending pole pieces, an armature pivoted to swing about an axis midway between said pole pieces and at right angles to the plane thereof, said armature extending on opposite sides of said axis, said armature having diametrically opposite arms of equal length, said armature being spaced from the plane of said pole pieces and being of a length less than the distance between said pole pieces, and a second electromagnet having poles disposed in quadrature with the poles of the first magnet and on the opposite side of the plane of the armature, the poles of the second electromagnet being closer to the plane of the armature, and spaced apart a distance less than the length of said armature.

In testimony whereof I have hereunto signed my name to this specification.

CLARK M. ADAMS.